(12) United States Patent
De Lepeleer et al.

(10) Patent No.: US 12,497,787 B2
(45) Date of Patent: Dec. 16, 2025

(54) FLOOR COVERING AND SET OF COMPONENTS FOR SUCH A FLOOR COVERING

(71) Applicant: FLOORING INDUSTRIES LIMITED, SARL, Bertrange (LU)

(72) Inventors: Els De Lepeleer, Sint-Amandsberg (BE); Kristof Van Vlassenrode, Deinze (BE)

(73) Assignee: UNILIN, BV, Wielsbeke (BE)

( * ) Notice: Subject to any disclaimer, the term of this patent is extended or adjusted under 35 U.S.C. 154(b) by 332 days.

(21) Appl. No.: 17/765,118

(22) PCT Filed: Oct. 8, 2020

(86) PCT No.: PCT/IB2020/059459
§ 371 (c)(1),
(2) Date: Mar. 30, 2022

(87) PCT Pub. No.: WO2021/070105
PCT Pub. Date: Apr. 15, 2021

(65) Prior Publication Data
US 2022/0403670 A1  Dec. 22, 2022

(30) Foreign Application Priority Data

Oct. 10, 2019 (BE) .................................... 2019/5673
Oct. 10, 2019 (BE) .................................... 2019/5674
Oct. 10, 2019 (BE) .................................... 2019/5675

(51) Int. Cl.
*E04F 15/10* (2006.01)
*B32B 3/06* (2006.01)
(Continued)

(52) U.S. Cl.
CPC .............. *E04F 15/105* (2013.01); *B32B 3/06* (2013.01); *B32B 5/02* (2013.01); *B32B 5/18* (2013.01);
(Continued)

(58) Field of Classification Search
CPC .......................... E04F 15/105; E04F 2203/065
See application file for complete search history.

(56) References Cited

U.S. PATENT DOCUMENTS 5,578,363 A * 11/1996 Finley ..................... E04F 15/18
428/95
6,586,066 B1 * 7/2003 Buckwalter ....... E04F 15/02138
52/746.1
(Continued)

FOREIGN PATENT DOCUMENTS

EP     3348420 A1    7/2018
EP     3483358 A1    5/2019
(Continued)

OTHER PUBLICATIONS

Search Report and Written Opinion from corresponding Belgian Application No. BE201905673, Jun. 24, 2020.
(Continued)

*Primary Examiner* — Travis M Figg
(74) *Attorney, Agent, or Firm* — Workman Nydegger

(57) ABSTRACT

A floor covering including a flexible underfloor having at least one foamed polymer layer; one or more sheet vinyl floor elements or LVT floor elements, one or more LVT floor elements, or one or more rigid LVT floor elements, an adhesive layer that bonds the underfloor and the floor element to one another.

20 Claims, 2 Drawing Sheets

(51) Int. Cl.
  *B32B 5/02* (2006.01)
  *B32B 5/18* (2006.01)
  *B32B 5/26* (2006.01)
  *B32B 7/12* (2006.01)
  *B32B 27/06* (2006.01)
  *B32B 27/12* (2006.01)
  *B32B 27/30* (2006.01)
  *B32B 27/40* (2006.01)

(52) U.S. Cl.
  CPC .................. *B32B 5/26* (2013.01); *B32B 7/12* (2013.01); *B32B 27/065* (2013.01); *B32B 27/12* (2013.01); *B32B 27/30* (2013.01); *B32B 27/304* (2013.01); *B32B 27/40* (2013.01); *E04F 15/107* (2013.01); *B32B 2255/10* (2013.01); *B32B 2260/021* (2013.01); *B32B 2260/046* (2013.01); *B32B 2262/101* (2013.01); *B32B 2266/0235* (2013.01); *B32B 2266/0278* (2013.01); *B32B 2307/554* (2013.01); *B32B 2307/718* (2013.01); *B32B 2451/00* (2013.01); *B32B 2471/00* (2013.01)

(56) References Cited

U.S. PATENT DOCUMENTS

| | | |
|---|---|---|
| 11,142,917 B2 | 10/2021 | Esbelin |
| 2002/0081410 A1 | 6/2002 | Buckwalter et al. |
| 2012/0017528 A1* | 1/2012 | Liu ................... E04F 15/02188 52/309.1 |
| 2012/0291387 A1* | 11/2012 | Keane ..................... E04F 15/02 52/309.4 |
| 2013/0104485 A1* | 5/2013 | Meersseman ............ B27N 7/00 428/53 |
| 2014/0305057 A1 | 10/2014 | Keane |
| 2017/0167145 A1* | 6/2017 | Naeyaert ............... E04F 15/102 |
| 2017/0350139 A1* | 12/2017 | De Rick ............... E04F 15/105 |
| 2018/0202170 A1* | 7/2018 | Duyck ............. E04F 15/02033 |
| 2018/0258652 A1* | 9/2018 | Meersseman ..... E04F 15/02033 |
| 2019/0145109 A1* | 5/2019 | Esbelin .................... B32B 5/24 428/213 |
| 2021/0396024 A1 | 12/2021 | Esbelin |
| 2022/0403670 A1* | 12/2022 | De Lepeleer ........... B32B 27/12 |

FOREIGN PATENT DOCUMENTS

| | | |
|---|---|---|
| WO | 2013179261 A1 | 12/2013 |
| WO | 2017046309 A1 | 3/2017 |
| WO | 2018087637 A1 | 5/2018 |

OTHER PUBLICATIONS

Search Report and Written Opinion from corresponding Belgian Application No. BE201905674, Jun. 24, 2020.
Search Report and Written Opinion from corresponding Belgian Application No. BE201905675, Jun. 23, 2020.
International Search Report and Written Opinion from PCT Application No. PCT/IB2020/059459, Nov. 26, 2020.

* cited by examiner

0
FLOOR COVERING AND SET OF COMPONENTS FOR SUCH A FLOOR COVERING

BACKGROUND

The present invention relates to floor coverings and to sets of components for the assembly of such a floor covering.

According to its first to its fourth aspect, the present invention relates more specifically to floor coverings comprising at least one sheet vinyl floor element and an underfloor. According to its fifth to its eighth aspect, the present invention relates more specifically to floor coverings comprising at least one luxury vinyl tile (LVT) floor element and an underfloor. According to its ninth to its twelfth aspect, the present invention more specifically relates to floor coverings comprising at least one rigid luxury vinyl tile (LVT) floor element and an underfloor.

Floor coverings comprising sheet vinyl are known per se, for example from EP 3348420. These floor coverings are often supplied on rolls with relatively large dimensions, for example 2 to 4 m in width and several m in length. On installation, it is ordinary to glue only the edges to the substrate. These floor coverings often undergo excessively high thermal expansion under changing environmental conditions, which can cause bubble formation once the floor covering has been laid in spaces that are to be provided with a floor covering. Such bubble formation can be particularly localized, for example in the areas of the floor covering subjected to direct sunlight, for example next to sliding windows. As the remaining areas of the floor covering are not exposed or exposed to a lesser degree, a bubble is formed in the locally warmed area.

Floor coverings comprising LVT are known for example from WO 2013/179261. Floor coverings comprising rigid LVT are known for example from WO 2018/087637. In the context of the present invention, floor panels conventionally referred to as SPC (solid or stone plastic composite) or WPC (waterproof or wood plastic composite) are also considered to be rigid LVT floor elements. SPC floor panels comprise a solid core layer of filled plastic, while WPC floor panels or floor elements comprise a foamed core layer of filled plastic.

In a similar manner, in floor coverings comprising LVT or rigid LVT floor elements, bubble formation can also occur in floating installation due to local exposure to heat. Moreover, gaps can occur between two such floor elements that are adjacent in the floor covering on repeated expansion and contraction. Such gaps can give rise to unwanted penetration of material and infiltration of water.

Floors constructed of such LVT elements often produce interfering noise when walked on. This is also the case in sheet vinyl floor elements. It is particularly the case in floating installation or in semi-floating installation, wherein only the edges are glued. The generally limited thickness of such floor elements can also play a role in this case.

SUMMARY

An object of the invention is to provide a floor covering that undergoes less extensive thermal expansion and/or produces less noise when walked on.

A floor covering according to a first aspect of the invention comprises
a. a flexible underfloor comprising at least one foamed polymer layer;
b. one or more sheet vinyl floor elements, each floor element having a layered structure comprising
an optional backlayer of soft PVC,
a soft or semi-hard PVC layer, to which or in which at least one reinforcing layer is attached or embedded, and
a finishing layer, typically comprising a decorative layer, a wear layer and optionally a coating on the outer side;
c. an adhesive layer that bonds the underfloor and the floor elements to one another,
wherein the total surface weight of the one or more reinforcing layers is preferably at least 30 grams per m² of floor element.

Multiple sheet vinyl floor elements are preferably floor elements lying adjacent to one another.

According to some embodiments, the total surface weight of the one or more reinforcing layers of the sheet vinyl elements can be at least 30 g/m², for example at least 50 grams per m² of floor element, more preferably at least 60 g/m².

In the context of this invention, according to all of its aspects, flexible means that when a strip product is glued on one of its sides and can move freely on the other opposite side, the product will sag under its own weight. Flexible also means that a product will sag under its own weight by more than 35 cm per m of projecting length. Preferably, a product should sag under its own weight by more than 40 cm per m of projecting length, such as more than 50 cm per m of projecting length. On the other hand, rigid or stiff means that a product will sag under its own weight by less than 35 cm per m of projecting length.

The underfloor is preferably flexible at all locations. The at least one foamed polymer layer is preferably flexible.

The floor elements of the first aspect are also preferably flexible. The floor elements that for example are used in the fifth and ninth aspects mentioned below can be flexible or rigid floor elements, for example with a core layer based on thermoplastic resin.

Underfloors are also well known as base layers for floor covering.

The layer of adhesive, also referred to as an adhesion layer or adhesive layer, serves to glue the floor elements to the underfloor.

The flexible underfloor comprises at least one, i.e. a first foamed polymer layer. According to some embodiments, the layer of adhesive can be located on a first side of the first polymer layer. According to some embodiments, a fiber layer can be applied to the second side of the first polymer layer.

This fiber layer can be a nonwoven, for example a spunbond or needle-punched nonwoven. The fiber layer is preferably configured of polyester, polyamide or polyolefin fibers, or fiberglass. The fiber layer can have a thickness that preferably varies between 0.1 and 1 mm, such as e.g. 0.7 mm. For example, this is a nonwoven, for example a needle-punched polyester fiber layer, with a surface weight of between 50 and 200 g/m², for example between 100 and 150 g/m², e.g. approximately 120 g/m². Preferably, this is a spunbond polyester, for example a spunbond polyester with a thickness of between 0.1 and 0.3 mm. This spunbond polyester can have a surface weight of between 10 and 30 g/m², for example 20 g/m².

The fiber layer can be bonded to the polymer layer by means of an adhesive, or it can be optionally partially embedded in the polymer material during production so that the polymer partially penetrates into the fiber layer. The polymer material can penetrate to over half the thickness of the fiber layer, for example up to 0.5 mm deep.

According to some embodiments, the underfloor, in or on its foamed polymer layer, can comprise at least one reinforcing layer.

It can be located on the polymer layer or be impregnated at the surface in the polymer layer. According to other embodiments, the at least one reinforcing layer can be embedded in the polymer layer, whether or not to half of the thickness of the polymer layer. In this case, the reinforcing layer is preferably completely impregnated in the polymer of the polymer layer. The at least one reinforcing layer can be located between the flexible foamed polymer layer and the adhesive layer if the adhesive layer is attached to the underfloor.

According to some embodiments, the at least one reinforcing layer of the underfloor can be a glass fiber web or a glass fiber fabric.

The at least one reinforcing layer is preferably a textile reinforcing layer. This textile layer preferably comprises a glass fiber textile, for example a nonwoven glass fiber textile or a woven glass fiber textile. This glass fiber textile preferably has a surface weight of 15 to 80 $g/m^2$, such as 25 to 55 $g/m^2$, such as 35 to 60 $g/m^2$, or 25 to 40 $g/m^2$. A woven glass fiber textile preferably has an open structure, for example a mesh structure or mesh fabric. Preferably, the open space between successive warp or weft threads can be between 1 mm and 1 cm.

The polymer-impregnated textile reinforcing layer preferably has a thickness of between 0.2 and 0.5 mm, more preferably between 0.3 and 0.4 mm.

In the event that the layer of adhesive is attached to the underfloor, according to some embodiments, this textile reinforcing layer can be located between the first polymer layer and the layer of adhesive.

According to some embodiments, the textile reinforcing layer can comprise a textile product that is located on the surface of the first polymer layer.

According to some embodiments, the textile reinforcing layer can comprise a textile product that is completely or partially embedded in the first polymer layer.

Completely embedded means that the polymer material of the first polymer layer penetrates all the way through the textile product, i.e. from the first side of the textile product, which is oriented toward the first polymer layer, to and possibly past the opposite side of the textile product, which faces away from the first polymer layer. Partially embedded means that the polymer material of the first polymer layer is penetrated only to a certain depth of the textile product, i.e. from the first side of the textile product that is oriented toward the first polymer layer, in the direction of but not all the way to the opposite side of the textile product, which faces away from the first polymer layer.

According to some embodiments, the textile reinforcing layer can comprise a textile product that is impregnated with polymer. Between the first polymer layer and the layer of adhesive, or on the first polymer layer, a textile reinforcing layer impregnated with polymer can thus be located. According to some embodiments, the polymer-impregnated textile reinforcing layer can be in contact with the first side of the first polymer layer.

According to some embodiments, the foamed polymer layer of the underfloor can be a polymer layer of PVC, PU or PVB.

PU refers to polyurethane. PVB refers to polyvinyl butyral.

According to some embodiments, the foamed polymer layer of the underfloor can be a PVC layer.

PVC refers to polyvinyl chloride or a copolymer of vinyl chloride and vinyl acetate. Preferably, this PVC polymer layer is produced from PVC plastisol, even more preferably from soft PVC. In an alternative, this PVC polymer layer is extruded. The PVC preferably has a density of 200 to 1200 $kg/m^3$, such as 300 to 700 $kg/m^3$.

In the event that the first polymer layer is a PVC layer and a polymer-impregnated textile reinforcing layer is provided, the polymer-impregnated textile reinforcing layer is preferably a textile layer impregnated with PVC. Soft PVC is preferably used herein, i.e. PVC with at least 40 phr of plasticizer, for example phthalate.

Preferably, the first foamed PVC polymer layer is produced from PVC plastisol, even more preferably from soft PVC. This PVC layer in foamed form can preferably have a thickness of between 0.3 and 1.6 mm, such as between 0.6 and 1.4 mm. Soft PVC refers here to PVC with at least 40 phr of plasticizer.

In the context of this invention, according to all of its aspects, phr refers to "parts per hundred resin," i.e. the amount of parts by weight of the component per hundred parts by weight of polymer, in this case per hundred parts by weight of PVC.

Furthermore, in the context of this invention, according to all of its aspects, soft PVC refers to PVC comprising 40 or more than 40 phr of plasticizers. Semi-hard or semi-soft PVC refers to PVC comprising between 10 and 40 phr of plasticizers, where hard PVC comprises less than or exactly 10 phr.

In the event that the underfloor comprises more than one reinforcing layer, a reinforcing layer can be located on the foamed polymer layer or between the foamed polymer layer and the adhesive layer (in cases where the adhesive layer is attached to the underfloor), or can be impregnated on the surface in the polymer layer, while a second reinforcing layer is completely or partially impregnated in the polymer of the polymer layer, whether or not in the center of the polymer layer. The further reinforcing layers can be reinforcing layers such as those described for the first reinforcing layer.

If a textile reinforcing layer is present comprising a textile product that is completely or partially embedded in the first polymer layer, a second layer polymer can be located on this textile reinforcing layer or between the adhesive layer and this textile reinforcing layer. Preferably, the polymer of this second polymer layer is identical to the polymer of the first polymer layer.

According to some embodiments, the second polymer layer can be a second PVC layer, particularly if the first polymer layer is a PVC layer.

Preferably, the second polymer layer is produced from PVC, particularly PVC plastisol, even more preferably produced from soft PVC, and more preferably foamed PVC. This second polymer layer, in foamed or unfoamed form, can have a thickness of between 0.1 and 1.3 mm, such as between 0.3 and 0.7 mm. In unfoamed form, a thickness of 0.15 to 0.25 mm is preferred.

According to yet further embodiments, the underfloor can comprise a second textile reinforcing layer which comprises a textile product. This second textile reinforcing layer can for example be embedded in the depth of the first, foamed polymer layer, for example, but not necessarily, to a good half of the thickness of this first polymer layer. Such an embedded second textile reinforcing layer can be obtained during the process for producing the first, optionally flexible, foamed polymer layer, wherein a first sublayer of foamed or unfoamed polymer is provided, on which the textile reinforcing material is laid and optionally completely or partially embedded, and after which a second sublayer of foamed or unfoamed polymer is provided. If this takes place in unfoamed form, further foaming is carried out during the further production steps.

In the event that the underfloor comprises a second polymer layer, for example a second PVC layer, then this second textile reinforcing layer can be positioned between the second polymer layer and the adhesive layer.

This textile layer preferably comprises a glass fiber textile, for example a nonwoven glass fiber textile or a woven glass fiber textile. This glass fiber textile preferably has a surface weight of 15 to 80 g/m$^2$, such as 25 to 55 g/m$^2$. However, it does not necessarily have to be identical to the textile layer of the first reinforcing layer.

According to some embodiments, the first and optionally further polymer layer can comprise plasticizers in an amount of 15 to 120 phr. In the case of a second PVC layer, the polymer material of this second polymer layer can comprise plasticizers in an amount of 15 to 120 phr. Preferably, the polymer material of the first and/or optionally the second polymer layer comprises 20 to 100 phr of plasticizers.

Generally speaking, in the context of this invention, according to all of its aspects, plasticizers include esters of carboxylic acids (for example esters of phthalic acid, iso- or terephthalic acid, trimellitic acid, and adipic acid), for example diisononyl phthalate (DINP), dioctyl terephthalate (DOTP), di-isononyl-1,2-cyclohexanedicarboxylate (DINCH), esters of phosphoric acid, for example triaryl- or trialkylaryl phosphates, for example tricresyl phosphate, chlorinated or unchlorinated hydrocarbons, ethers, polyesters, polyglycols, sulfonamides, or combinations thereof.

The polymer of the first and/or optionally second polymer layer can comprise fillers of between 10 and 70 wt %. Fillers can include glass fibers, calcium hydroxide (slaked lime), calcium carbonate and calcium hydrogen carbonate, and/or $CaMg(CO_3)_2$, talc, or also lightweight fillers such as hollow microspheres (Expancel). The above-mentioned percent by weight (wt %) is expressed as the weight of the filler based on the weight of the polymer, optionally PVC, in which the filler is contained.

By means of fillers, one can impart to the underfloor a surface weight per m$^2$ of more than 1 kg per mm of thickness, and preferably more than 1.5 kg per mm of thickness of this underfloor.

In general, the underfloor used in the context of all aspects of the invention preferably shows a surface weight of at least 0.5 kg or at least 1 kg per m$^2$, and preferably at least 1.5 kg per m$^2$.

By means of the adhesive bonding of the floor elements to a preferably relatively heavy underfloor, a floor covering is obtained with good noise characteristics, without gluing to the actual substrate being necessary. The floor coverings of the invention according to all of its aspects prevent excessive gap formation under changing environmental conditions, even when they are not glued to the actual substrate. In this way, their bonding to a common underfloor is found to be sufficient. In cases where the underfloor and/or the floor elements include one or more reinforcing layers, this effect can be further influenced.

Preferably, the floor covering of the invention, according to all of its aspects, shows the feature of having the longitudinal direction of the elements or strips of the underfloor oriented transversely to the longitudinal direction of the floor elements. In this way, it becomes possible to keep the seams between the elements of the underfloor even tighter by means of floor elements that bridge the relevant seam. In cases where the longitudinal direction of the elements of the underfloor and the floor elements coincide, the floor covering preferably has the feature that the seams between the elements of the underfloor do not coincide at any location with the longitudinal seams between the floor elements. Preferably, the distance between the seams of the underfloor and the closest seam of the floor elements is at least 3 cm and/or at least 20% of the width of the floor elements at all locations of the floor covering.

Furthermore, additives can be contained in the polymer of the first and/or optionally second polymer layer, such as pigments and coloring agents, preservatives, antifungal agents, thermal stabilizers, UV stabilizers, blowing agents, viscosity-adjusting agents, and the like.

The polymer of the first and/or second polymer layer can be an extruded polymer layer or a combination of different coextruded or non-coextruded polymer layers. If the polymer is PVC, the first and/or the second PVC layer can be formed of one or more layers of PVC plastisol by means of a coating process.

A second polymer layer, preferably a PVC layer, can be watertight.

The polymer of the first, optionally flexible, layer polymer is foamed. The polymer of the second, optionally flexible, layer polymer can also be foamed. A foamed layer refers to a layer comprising hollow spaces, preferably in a number such that the density of the material is decreased by at least 10%, and preferably even by at least 25%, based on the weight of an equal volume of thermoplastic material without hollow spaces. Preferably, this is a so-called closed cell foam. An unfoamed layer refers to a layer without hollow spaces, or at least at most with a number of hollow spaces such that the density of the material is not decreased, or decreased by not more than 10%, more preferably not more than 2%.

The polymer of the first and/or second foamed polymer layer preferably has a density of 200 to 1200 kg/m$^3$, such as 300 to 700 kg/m$^3$. This is in particular the case if the polymer is PVC.

The polymer can be chemically or mechanically foamed.

According to a first possibility, the foamed layer is obtained at least by means of a mechanical foaming process. This means that in the relevant layer, holes are formed by removing the thermoplastic material and replacing it with a gas (such as air), often by means of a mechanical action or by blowing in a gas (such as air) under pressure. Alternatively, it can be obtained using expanding beads in a polymer layer.

According to a second possibility, the foamed layer is obtained at least by means of a chemical foaming process. This means that in the relevant layer, holes are formed by means of a gaseous reaction product. For example, azodicarbonamide can be used. This substance releases nitrogen gas on heating that remains present in the foamed layer in the form of bubbles.

According to a third possibility, the foamed layer is obtained at least by means of fillers, wherein these fillers in turn comprise one or more holes. Here, for example, one can make use of the expanded state of the above-mentioned microspheres. More specifically, the microspheres known from WO 2013/178561 can be used.

According to some embodiments, the underfloor can have a thickness of between 1.25 and 2.5 mm. Preferably, the underfloor has a thickness of between 1.4 and 2.2 mm, for example between 1.7 and 1.9 mm.

Preferably, the underfloor has a density of between 400 and 1800 kg/m$^3$, such as between 600 and 1200 kg/m$^3$.

The above thickness ranges, namely at least 1.25 mm, in combination with the density ranges, namely at least 400 kg/m$^3$, lead to an underfloor having a surface weight, specifically of at least 0.5 kg/m$^2$, with already noticeable noise damping occurring when the floor covering is walked on.

According to some embodiments, the underfloor can have a "punctual conformability" that is greater than 0.5. The "punctual conformability" or PC is determined according to CEN/TS 16354:2013 and is calculated by the formula:

PC=(100−shore $A$)/thickness wherein "thickness" is the thickness of the underfloor and this thickness is set at 2.5 mm if the effective thickness of the underfloor is less than 2.5 mm. According to the standard, shore A is measured on the underside of the underfloor.

According to some embodiments, the adhesive can be an adhesive selected from the group consisting of PSA adhesives and acrylate adhesives. PSA adhesives are "pressure sensitive adhesives."

According to some embodiments, the adhesive can be present in an amount of 5 to 90 g/m$^2$. Preferably, the adhesive is present in an amount of 25 to 75 g/m$^2$.

The adhesive can be provided on the underside of the floor elements or on the upper side of the underfloor.

In cases where the adhesive is provided on the upper side of the underfloor, according to embodiments, a watertight film can be provided under the adhesive, for example a polymer film such as a PET film. This film is preferably located between the adhesive layer and the immediately adjacent layer of the underfloor. This polymer film can for example be glued to the immediately adjacent layer of the underfloor with a further adhesive layer.

According to some embodiments, the underlayer can be provided on a first edge with a recess on the side where the adhesive is present, and wherein the underlayer is provided on a second edge, opposite to the first edge, with a recess on the side opposite the side where the adhesive is present, such that if the recess on the first side of a first underlayer for a floor covering is brought into contact with the recess on the second side of a second underlayer for a floor covering, the two base layers for the floor covering are substantially coplanar.

Preferably, the underfloor is constructed of one or more strips of underfloor, for example strips with a width of between 0.5 and 2 m. In order to provide such strips, rolls of underfloor can be provided. Such rolls can have a length of up to 10 m, even 15 m. Preferably, the rolls have a length of between 5 and 10 m, for example 5, 6, 7, 8, 9 or 10 m. In order to provide a strip of underfloor, a roll is unrolled and cut to length, after which a further immediately adjacent strip is provided in the same manner. The side edges are preferably laid closely connected to one another.

An underfloor according to the first aspect of the invention is advantageous in that the underfloors are essentially fully recyclable and/or of above-average stability and/or show favorable resistance to residual indentation and/or can produce an improvement in the acoustic characteristics of the floor covering lying thereon. The underfloors according to the invention can show greater flatness than known underfloors. The underfloors can contribute to better acoustic performance of the floor, i.e. better sound damping. The underfloors according to the invention also show better water resistance at the joints between two underfloors connected to one another.

The underfloor is flexible at all locations. Preferably, the at least one foamed polymer layer is flexible.

The polymer of the first and optionally the second polymer layer is preferably a soft polymer.

In the context of this invention, according to all of its aspects, soft polymer refers to polymer that comprises 40 or more than 40 phr of plasticizers. Semi-hard or semi-soft polymer refers to polymer that comprises between 10 and 40 phr of plasticizers, while hard polymer comprises less than or exactly 10 phr.

Furthermore, additives can be contained in the polymer such as pigments and coloring agents, preservatives, anti-fungal agents, thermal stabilizers, UV stabilizers, blowing agents, viscosity-adjusting agents, and the like.

The floor covering according to the first aspect of the invention comprises one or more sheet vinyl elements.

The one or more preferably adjacent sheet vinyl floor elements each have a layered structure comprising a carrier of soft PVC, a soft or semi-hard PVC intermediate layer on this carrier, and a finishing layer.

According to some embodiments, the finishing layer comprises a decorative layer, a wear layer, and optionally a coating on the outer side.

The floor elements can be provided on their upper side with a relief that can be pressed in during production by embossing and/or can be realized by means of a chemical embossing method.

Unless otherwise specified, in the context of this invention, according to all of its aspects, soft PVC refers to a PVC material with 40 or more than 40 phr of plasticizers. Unless otherwise specified, in the context of this invention, according to all of its aspects, semi-hard (or semi-soft) PVC refers to a PVC material with more than 10 phr of plasticizers, but less than 40 phr of plasticizers. Unless otherwise specified, in the context of this invention, according to all of its aspects, hard PVC refers to a PVC material with less than 10 phr of plasticizers or without any plasticizers.

The "phr" of a component in a product refers to "parts per hundred resin," and is the number of parts by weight of the component per hundred parts by weight of polymer in this product.

The sheet vinyl used in this first aspect of the invention typically has a layered structure, and comprises
  an optional backlayer of soft PVC,
  a soft or semi-hard PVC layer, to which or in which at least one reinforcing layer is attached or embedded, and
  a finishing layer, typically comprising a decorative layer, a wear layer and optionally a coating on the outer side.

Optionally, the soft or semi-hard PVC layer comprises a reinforcing layer, for example a textile reinforcing layer, for example reinforcing layers such as described for the reinforcing layers of the underfloor according to the first aspect of the invention.

The optional backlayer consists of soft PVC and typically has a thickness of more than 0.5 mm, for example between 0.5 mm and 5 mm, for example between 0.75 mm and 2.5 mm. The material of which this backlayer is composed also comprises, in addition to PVC, fillers (up to 60 wt % based on the entire PVC material, for example approximately 50 wt %) and additives, and preferably more than 40 phr of plasticizer, particularly more than 50 phr of plasticizer. The backlayer can be foamed or non-foamed and can have a density of between 0.3 g/cm$^3$ and 1.9 g/cm$^3$.

The soft or semi-hard PVC layer, to which or in which optionally a reinforcing layer is attached or embedded, comprises or preferably is a fiber web impregnated with PVC. The PVC used to partially or preferably completely impregnate the glass fiber web is preferably soft PVC. The PVC also comprises, in addition to the polymer, fillers (up to for example 75 wt % or 50 wt % based on the entire PVC material, for example to approximately 40 wt %) and additives, and preferably more than 40 phr of plasticizer, particularly more than 50 phr of plasticizer. The thickness of this layer can be as much as 0.6 mm, but is preferably between 0.20 mm and 0.40 mm, such as approximately 0.30 mm. The density of the PVC used is preferably less than 1.9 $g/cm^3$, such as for example between 1.4 $g/cm^3$ and 1.7 $g/cm^3$, for example between 1.5 $g/cm^3$ and 1.6 $g/cm^3$. As a web, a glass fiber web (nonwoven) is preferably used that has approximately the same thickness as this layer. The preferred web has a thickness of 0.3 mm and a surface weight of 35 $g/m^2$.

The finishing layer typically comprises a decorative layer, a wear layer, and optionally a coating on the outer side.

The decorative layer typically comprises soft PVC with a thickness of between 0.09 mm and 0.6 mm, for example between 0.4 mm and 0.6 mm. It can be a PVC layer (for example a film) that is printed with a decor. The PVC used can be soft PVC. In addition to the polymer, this PVC layer also comprises additives and fillers (up to 50 wt % based on the entire PVC composition) and plasticizers, preferably more than 40 phr, particularly more than 50 phr of plasticizer. The PVC can be formed or unformed, but is preferably foamed. If a foamed PVC material is used, the PVC layer can have a density of below 1 $g/cm^3$, such as between 0.5 and 0.8 $g/cm^3$. In unfoamed PVC, the density is preferably between 1 $g/cm^3$ and 1.6 $g/cm^3$, such as between 1.2 $g/cm^3$ and 1.4 $g/cm^3$. The layer can be supplied as film, either preprinted or not, as emulsion or (micro)suspension polymerization layers, by calendering, or as a plastisol layer.

A wear layer is provided on this decorative layer that can be selected with a thickness for example of between 0.15 mm and 1.0 mm, for example between 0.2 mm and 0.55 mm. It can preferably be a soft or semi-hard PVC layer, for example a film. Preferably, no fillers are added or used, and the layer is transparent. In addition to the polymer, this PVC layer also comprises additives and plasticizers, preferably more than 20 phr, particularly more than 30 phr of plasticizers. Plasticizers of up to 40 phr can be provided in this PVC. Preferred ranges for plasticizers are 20 to 45 phr, more preferably 35 to 40 phr. The PVC can preferably have a density of between 1 $g/cm^3$ and 1.5 $g/cm^3$, such as between 1.2 $g/cm^3$ and 1.3 $g/cm^3$.

The wear layer is optionally provided with abrasive particles, for example $Al_2O_3$ particles. The PVC is typically free of fillers. The layer can be supplied as a film or as emulsion or (micro)suspension polymerization layers, by calendering, or as a plastisol layer.

As a finishing layer, the sheet vinyl can also further comprise a lacquer layer or coating on top of the wear layer that consists of polyurethane (PU), for example a UV-curing PU layer. The thickness can be up to 20, even 30 μm, but is preferably approximately 10 μm thick.

All of the above-mentioned PVCs are preferably obtained via emulsion or (micro)suspension polymerization and have a K value of between 50 and 90.

If sheet vinyl is used as a floor element or elements, these sheet vinyl elements often have a larger surface and are supplied in rolls between 0.5 and 4 m wide and 2.5 to 10 m long. However, smaller rolls with a limited width of 0.5 to 1.5 m, for example approximately 1 m, can be used. Nevertheless, the use of relatively small sheets of sheet vinyl, which are placed next to one another in order to provide a floor covering, is not excluded. These smaller sheets of sheet vinyl can be sheet vinyl, preferably having rectangular surfaces with a width of between 8 and 50 cm and a length of between 50 and 200 cm.

According to the invention, the one or more sheet vinyl elements comprise at least one, but preferably two or more reinforcing layers.

According to some embodiments, a reinforcing layer can be attached to or embedded in the sheet vinyl floor elements in the soft or semi-hard PVC layer.

The at least one, but preferably two or more reinforcing layer(s) is/are preferably (a) textile reinforcing layer(s). The textile layer preferably comprises a glass fiber textile, for example a nonwoven glass fiber textile or a woven glass fiber textile. This glass fiber textile preferably has a surface weight of 15 to 80, such as 25 to 55 $g/m^2$. A woven glass fiber textile preferably has an open structure, for example a mesh structure or mesh fabric. Preferably, the open space between successive warp or weft threads can be between 1 mm and 1 cm.

The total sum of surface weights in the sheet vinyl floor element preferably amounts to a surface weight of preferably more than 30 $g/m^2$, more preferably more than 50 $g/m^2$, such as between 30 and 180 $g/m^2$.

According to some embodiments, the at least one reinforcing layer of the floor elements can comprise a first and a second reinforcing layer, each of which has a surface weight of at least 15 $g/m^2$, and preferably each of which has a surface weight of at least 25 $g/m^2$.

According to some embodiments, in the sheet vinyl floor elements, the one or more reinforcing layers in said floor elements can be glass fiber webs or glass fiber fabrics.

According to some embodiments, the underfloor can comprise a reinforcing layer, and wherein each of the at least one sheet vinyl floor elements comprises one or two reinforcing layers.

According to a second aspect of the invention, a floor covering is provided comprising
 a. a flexible underfloor comprising at least one foamed polymer layer, and at least one reinforcing layer;
 b. one or more sheet vinyl floor elements lying adjacent to one another, each floor element having a layered structure comprising
   an optional backlayer of soft PVC,
   a soft or semi-hard PVC layer, to which or in which at least one reinforcing layer is attached or embedded, and
   a finishing layer, typically comprising a decorative layer, a wear layer and optionally a coating on the outer side;
 c. an adhesive layer that bonds the underfloor and the carrier of the floor elements to one another;
for which the total surface weight of the reinforcing layers of the underfloor and the floor element is preferably at least 30 grams per $m^2$.

Preferably, the total surface weight of the reinforcing layers of the underfloor and the floor element is at least 50 g per $m^2$.

The sheet vinyl used for this second aspect of the invention can have the features described for the sheet vinyl used in the floor covering according to the first aspect of the invention.

The underfloor used for this second aspect of the invention can have the features described for the underfloor used in the floor covering according to the first aspect of the invention, with the additional feature that the underfloor comprises at least one reinforcing layer that is optionally embedded in the polymer layer.

The reinforcing layer can be located on the polymer layer or can be impregnated in the surface of the polymer layer. According to other embodiments, the at least one reinforcing layer can be embedded in the polymer layer, whether or not to half of the thickness of the polymer layer. In this case, the reinforcing layer is preferably completely impregnated in the polymer of the polymer layer. The at least one reinforcing layer can be located between the flexible foamed polymer layer and the adhesive layer if the adhesive layer is attached to the underfloor.

The reinforcing layer can be a textile reinforcing layer, for example a glass fiber textile, for example a nonwoven or woven, with a surface weight of between 15 and 80 g/m², more preferably between 25 and 40 g/m².

The textile reinforcing layer can be impregnated with polymer, and preferably impregnated with the same type of polymer (optionally an identical polymer) as the polymer of the polymer layer of the underfloor.

The underfloor can also comprise two or more mutually identical or different reinforcing layers.

According to a third aspect of the invention, a set of components is provided comprising a flexible underfloor and at least one floor element.

A set of components according to the third aspect is provided, the set comprising a flexible underfloor and at least one floor element, which set of components is suitable for making a floor covering in accordance with one of the first or second aspects of the invention.

The floor coverings according to the first and second aspects of the invention have favorable properties with respect to thermal expansion. It was found that gluing of one or more sheet vinyl elements according to the first or second aspects of the invention to an underfloor had a highly positive effect on, i.e. reduced, thermal expansion.

According to some embodiments, the adhesive layer can be applied to the foamed and flexible polymer layer of the underfloor, and wherein the adhesive layer is optionally provided with a protective film.

According to some embodiments, the adhesive layer can be applied to a side of the sheet vinyl, and wherein the adhesive layer is optionally provided with a protective film.

A set of components may comprise:
a. a flexible underfloor comprising at least one foamed polymer layer to which an adhesive layer is applied on one side, wherein the adhesive layer is provided with a protective film;
b. one or more sheet vinyl floor elements, each floor element having a layered structure comprising
an optional backlayer of soft PVC,
a soft or semi-hard PVC layer, to which or in which at least one reinforcing layer is attached or embedded, and
a finishing layer, typically comprising a decorative layer, a wear layer and optionally a coating on the outer side;
the total surface weight of the one or more reinforcing layers being at least 30 grams per m² of floor element.

A set of components may comprise:
a. a flexible underfloor comprising at least one foamed polymer layer;
b. one or more sheet vinyl floor elements, each floor element having a layered structure comprising
an optional backlayer of soft PVC,
a soft or semi-hard PVC layer, to which or in which at least one reinforcing layer is attached or embedded, and
a finishing layer, typically comprising a decorative layer, a wear layer and optionally a coating on the outer side;
an adhesive layer provided on the soft or semi-hard PVC layer in cases where no backlayer is provided, or on the backlayer in cases where a backlayer is provided, whether or not provided with a protective film;
the total surface weight of the one or more reinforcing layers being at least 30 grams per m² of floor element.

The total surface weight of the one or more reinforcing layers of the sheet vinyl elements is at least 30 grams per m² of floor element.

A set of components may comprise:
a. an underfloor comprising at least one foamed and flexible polymer layer and at least one reinforcing layer, an adhesive layer being applied thereto on the polymer layer or the reinforcing layer on one side, wherein the adhesive layer is provided with a protective film;
b. one or more sheet vinyl floor elements, each floor element having a layered structure comprising
an optional backlayer of soft PVC,
a soft or semi-hard PVC layer, to which or in which at least one reinforcing layer is attached or embedded, and
a finishing layer, typically comprising a decorative layer, a wear layer and optionally a coating on the outer side;
wherein the total surface weight of the reinforcing layers of the underfloor and the floor element is at least 30 grams per m².

A set of components may comprise:
a. an underfloor comprising at least one foamed and flexible polymer layer and at least one reinforcing layer;
b. one or more sheet vinyl floor elements, each floor element having a layered structure comprising
an optional backlayer of soft PVC,
a soft or semi-hard PVC layer, to which or in which at least one reinforcing layer is attached or embedded, and
a finishing layer, typically comprising a decorative layer, a wear layer and optionally a coating on the outer side;
an adhesive layer provided on the soft or semi-hard PVC layer in cases where no backlayer is provided, or on the backlayer in cases where a backlayer is provided, whether or not provided with a protective film;
wherein the total surface weight of the reinforcing layers of the underfloor and the floor element is at least 30 grams per m².

A protective film is a film that is applied to the adhesive and must be removed in order to allow the adhesive to exert its adhesive force. Such protective film is also referred to as release film.

The underfloor and the one or more floor elements, and all possible embodiments and possible features, are those described with respect to the first and second aspects of the invention.

The adhesive and the adhesive layer according to this third and fourth aspect of the invention are those described for the first and second aspects of the invention.

According to a fourth aspect, a floor covering is provided that comprises an underfloor and one or more floor elements.

A floor covering according to the fourth aspect comprises a. a flexible underfloor comprising at least one foamed polymer layer;
b. one or more floor elements, each floor element having a layered structure comprising
   an optional backlayer of soft polymer,
   a soft or semi-hard polymer layer, to which or in which at least one reinforcing layer is attached or embedded, and
   a finishing layer, typically comprising a decorative layer, a wear layer and optionally a coating on the outer side;
c. an adhesive layer that bonds the underfloor and the floor elements to one another,
wherein the total surface weight of the one or more reinforcing layers is preferably at least 30 grams per $m^2$ of floor element.

Features described for the first, second or third aspects of the invention are also applicable for this fourth aspect, unless they are technically incompatible.

Multiple floor elements are preferably floor elements lying adjacent to one another. The polymer can for example be PVC, polypropylene (PP) or polyethylene (PE).

The floor elements are preferably flexible floor elements. The floor elements can be sheet vinyl floor elements.

According to a fifth aspect, the present invention is intended to provide an alternative floor covering, which according to preferred embodiments is less likely to produce noise when walked on.

A floor covering according to the fifth aspect of the invention comprises
d. a flexible underfloor comprising at least one foamed polymer layer;
e. one or more LVT floor elements, each floor element having a layered structure comprising a core layer formed of PVC, to which or in which one or more reinforcing layers is/are attached or embedded, and a finishing layer on this core layer, the total surface weight of the one or more reinforcing layers being at least 60 grams per $m^2$ of floor element;
f. an adhesive layer that bonds the underfloor and the one or more floor elements to one another.

According to some embodiments of the fifth aspect, when more than one LVT floor element is contained in the floor covering, the LVT floor elements are preferably floor elements lying adjacent to one another. The floor elements can be provided on one or more sides of a coupling means in order to couple two floor elements to each other. This coupling means can be any coupling means known in the prior art, for example tongue and groove coupling means, coupling means comprising click systems, coupling means comprising fold-down systems, coupling means comprising rotating profiles, and the like. It is therefore clear that such a floor element is preferably provided, at least on one pair of opposite edges, with coupling means which allow two of such floor panels to be coupled to each other, wherein in the coupled state, an interlock occurs both in a horizontal direction perpendicular to the relevant edges and in the plane of the coupled panels as well as in a vertical direction perpendicular to the plane of the coupled panels.

According to some embodiments, the total surface weight of the one or more reinforcing layers of the floor elements is at least 60 g/$m^2$, for example at least 80 grams per $m^2$ of floor element, more preferably at least 100 g/$m^2$.

The underfloor used in the context of the present fourth aspect of the invention preferably shows the features of the underfloor described by means of the first aspect of the invention and/or the preferred embodiments thereof.

The one or more LVT floor elements lying adjacent to one another each have a layered structure comprising a core layer of PVC and a finishing layer or top layer.

Luxury vinyl tiles or "LVT" are PVC floor elements that are composed of a layered structure. They comprise a top layer which itself is also layered and typically comprises a decorative layer to which a wear layer and optionally a coating is applied. The decorative layer can be a PVC layer, optionally a film that is provided with a decor. Decorative layers, for example films with a thickness of between 0.08 mm and 0.3 mm of soft or semi-hard PVC or hard PVC are such decorative layers. In the case of thinner decorative layers (with thicknesses of up to approximately 0.15 mm), semi-hard PVC with a relatively low filler content (up to 25 wt % based on total PVC) is more likely to be used, whereas for thicker layers, for example films, (over 0.15 mm), soft PVC with a filler content of up to 150 phr is more likely to be used. Thinner decorative layers are preferably PVC films, whereas thicker decorative layers are more likely to be used for emulsion or (micro)suspension polymerization layers. The wear layer is typically a hard or semi-hard transparent PVC layer with a thickness of between 0.15 mm and 1 mm (for example between 0.2 mm and 0.55 mm) and optionally provided with abrasive particles, for example $Al_2O_3$ particles. Plasticizers of up to 40 phr are provided in this PVC. Preferred ranges for plasticizers are less than 40 phr, more preferably 25 to 35 phr. The PVC is typically free of fillers. The layer can be supplied as a film or as emulsion or (micro)suspension polymerization layers, by calendering or as a plastisol layer. A coating can be applied on this wear layer, for example a PU layer, for example a UV-curing PU layer. The thickness can be up to 20, even 30 μm, but is preferably approximately 10 μm thick.

Under the top layer, these PVC floor elements comprise a core layer, also referred to as a substrate. Depending on the choice of polymer and reinforcing layers, this core layer will determine whether these floor elements are flexible LVT floor elements or rigid LVT floor elements.

In the context of this invention, flexible and rigid indicate in this case as well whether or not the floor elements, when a strip product is glued on one side and can move freely on the other opposite side, sag much under their own weight. Flexible also means that a product will sag under its own weight by more than 35 cm per m of projecting length. Preferably, a product should sag under its own weight by more than 40 cm per m of projecting length, such as more than 50 cm per m of projecting length. Consequently, rigid or stiff means that a product will sag under its own weight by less than 35 cm per m of projecting length.

For rigid LVT floor elements, the core layer should primarily comprise hard or semi-soft PVC. The core layer can comprise one or more, for example two reinforcing layers that are embedded on or between the hard or semi-soft PVC layer or layers. The reinforcing layer or layers comprise a fiber web, often a glass fiber web, in which the hard or semi-hard PVC is partially or completely impregnated. Glass fiber webs with a surface weight of between 25 and 150 g/$m^2$ can be used, for example webs with a surface weight of between 30 and 75 g/$m^2$.

According to the invention, the total surface weight of the one or more reinforcing layers is at least 60 g/$m^2$, preferably at least 80 g per $m^2$ of the floor element, more preferably at least 100 g/$m^2$.

The core layer comprises hard or semi-hard PVC that in total is between 2 mm and 6 mm thick, for example between 3 mm and 4.5 mm, into or on which the reinforcing layers are incorporated. For example, one of the reinforcing layers can provide the underside of the floor element. A portion of the PVC can be present in the core layer above the uppermost of the one or more glass fiber webs. The thickness of this PVC layer above the uppermost of the one or more glass fiber webs can be between 0.3 mm and 0.7 mm. The thickness of the PVC layer between the uppermost and undermost glass fiber web, in cases where multiple glass fiber webs are provided, can vary between for example 2 and 4 mm. A portion of the PVC can be present in the core layer under the undermost of the one or more glass fiber webs. The thickness of this PVC layer under the undermost of the one or more glass fiber webs can be between 0.3 mm and 0.7 mm. In cases where a reinforcing layer is provided, this layer can lie centrically or eccentrically with respect to the layer of hard or semi-hard PVC. The hard or semi-hard PVC preferably comprises up to 15 phr of plasticizer, ideally between 7 and 10 phr. The hard or semihard PVC preferably comprises up to 70 wt % of fillers (based on the entire weight of the PVC composition).

On the side of the core layer that is in contact with the top layer, a layer of soft or semi-hard PVC can also further be present, preferably with a thickness of between 0.25 and 0.75 mm, such as for example between 0.35 mm and 0.55 mm. This PVC preferably comprises more than 30 phr of plasticizer (for example between 30 and 50 phr of plasticizer) and can comprise more than 50 wt % of fillers. The thickness of this layer can vary between 0.3 and 1 mm, for example between 0.35 mm and 0.75 mm.

For flexible LVT floor elements, the core layer should primarily comprise soft PVC or semi-hard PVC. The core layer can comprise one or more, for example two reinforcing layers that are embedded on or between the soft PVC layer or layers. The reinforcing layer or layers comprise a fiber web, often a glass fiber web, in which the soft or semi-hard PVC is partially or completely impregnated. Glass fiber webs with a surface weight of between 25 and 150 g/m$^2$ can be used, for example webs with a surface weight of between 30 and 75 g/m$^2$. In some embodiments, the core layer comprises a reinforcing layer comprising a glass fiber web, which will form the side of the core layer that comes into contact with the top layer, which is in contact with the decorative layer.

The core layer comprises soft or semi-hard PVC, which in total is between 1.2 mm and 6 mm thick, for example between 1.2 mm and 4.5 mm, into or on which the reinforcing layers are incorporated. A portion of the PVC can be present in the core layer above the uppermost of the one or more glass fiber webs. The thickness of this PVC layer above the uppermost of the one or more glass fiber webs can be between 0.3 mm and 2 mm. The thickness of the PVC layer between the uppermost and undermost glass fiber web, in cases where multiple glass fiber webs are provided, can vary between for example 2 and 4 mm. A portion of the PVC can be present in the core layer under the undermost of the one or more glass fiber webs. The thickness of this PVC layer under the undermost of the one or more glass fiber webs can be between 0.75 mm and 3 mm. In cases where a reinforcing layer is provided, this layer can lie centrically or eccentrically with respect to the layer of soft PVC. The soft PVC or semi-hard PVC preferably comprises more than 30 phr of plasticizer. The soft or semi-hard PVC preferably comprises up to 65 wt % of fillers (based on the entire weight of the PVC composition).

LVT floor elements, both flexible and rigid, often have limited surface dimensions. They can be configured as "planks," preferably being rectangular surfaces with a width of between 8 and 50 cm and a length of between 50 and 200 cm, preferably between 1.0 and 1.2 m long and between 0.12 and 0.23 m wide.

The different layers can be produced by means of PVC plastisol. In alternative form, the layers are extruded PVC layers, or they are formed by melting together of PVC particles or are formed by calendering.

The completely or incompletely impregnated reinforcing layer in the LVT floor elements can be a textile reinforcing layer. This textile layer preferably comprises a glass fiber textile, for example a nonwoven glass fiber textile or a woven glass fiber textile. This glass fiber textile preferably has a surface weight of 15 to 80, such as 25 to 55 g/m$^2$. The LVT floor element can comprise several such reinforcing layers, for example textile reinforcing layers, so that the total sum of the surface weights of these reinforcing layers is more than 65 g/m$^2$.

Preferably, a woven glass fiber textile has an open structure, for example a mesh structure or mesh fabric. Preferably, the open space between successive warp or weft threads can be between 1 mm and 1 cm.

LVT floor elements often have limited surface dimensions. They can be configured as "planks," preferably being rectangular surfaces with a width of between 8 and 50 cm and a length of between 50 and 200 cm.

The different layers can be produced by means of PVC plastisol. In alternative form, the layers are extruded PVC layers, or they are formed by melting together of PVC particles.

The floor elements can be provided on their upper side with a relief that can be pressed in during production by embossing, and/or can be obtained by means of a chemical embossing technique.

According to the invention, the one or more LVT elements comprise at least one, but preferably two or more reinforcing layers.

According to some embodiments, one of the at least one reinforcing layer(s) can be embedded in the core layer.

According to some embodiments, one of the at least one reinforcing layer(s) can be positioned between the core layer and the finishing layer.

According to some embodiments, the LVT floor elements can comprise at least two reinforcing layers. According to some embodiments, one of the two reinforcing layers can be embedded in the core layer, and a reinforcing layer is positioned between the core layer and the finishing layer.

According to some embodiments, the at least one reinforcing layer of the floor elements can comprise a first and a second reinforcing layer, each of which has a surface weight of at least 15 g/m$^2$, and preferably each of which has a surface weight of at least 25 g/m$^2$.

According to some embodiments, the one or more reinforcing layers of the floor elements can be glass fiber webs or glass fiber fabrics.

According to some embodiments, the LVT floor element can be free of reinforcing layers, more specifically free of glass fibers.

Preferably, this LVT floor element is obtained by extrusion.

According to some embodiments, the underfloor can comprise a reinforcing layer, and wherein each of the at least one LVT floor element(s) comprises at least one reinforcing layer.

According to a sixth aspect, a floor covering is provided comprising
   a. a flexible underfloor comprising at least one foamed polymer layer, and at least one reinforcing layer;

b. one or more LVT floor elements lying adjacent to one another, each floor element having a layered structure comprising a core layer of PVC, to which or in which at least one reinforcing layer is attached or embedded, and a finishing layer on this core layer;

c. an adhesive layer that bonds the underfloor and the one or more floor elements to one another;

for which the total surface weight of the reinforcing layers of the underfloor and the floor element is preferably at least 65 grams per $m^2$.

The total surface weight of the reinforcing layers of the underfloor and the floor element is preferably at least 80 grams per $m^2$, more preferably at least 100 grams per $m^2$.

The LVT used for this sixth aspect of the invention can have the features described for the LVT used in the floor covering according to the fifth aspect of the invention.

The underfloor used for this sixth aspect of the invention can have the features described for the underfloor used in the floor covering according to the first and fifth aspect of the invention, with the additional feature that the underfloor comprises at least one reinforcing layer that is optionally embedded in the polymer layer. The reinforcing layer can be located on the polymer layer or be impregnated at the surface in the polymer layer. According to other embodiments, the at least one reinforcing layer can be embedded in the polymer layer, whether or not to half of the thickness of the polymer layer. In this case, the reinforcing layer is preferably completely impregnated in the polymer of the polymer layer. The at least one reinforcing layer can be located between the flexible foamed polymer layer and the adhesive layer if the adhesive layer is attached to the underfloor.

The reinforcing layer can be a textile reinforcing layer, for example a glass fiber textile, for example a nonwoven or woven, with a surface weight of between 15 and 80 $g/m^2$, more preferably between 25 and 40 $g/m^2$. The textile reinforcing layer can be impregnated with polymer, and preferably impregnated with the same type of polymer (optionally an identical polymer) as the polymer of the polymer layer of the underfloor. The underfloor can also comprise two or more mutually identical or different reinforcing layers.

The PVC layers and materials described in the context of the fifth or sixth aspect of the invention preferably comprise PVC with a K value of between 50 and 90.

According to a seventh aspect, a set of components is provided, comprising an underfloor and at least one floor element.

A set of components comprises an underfloor and at least one floor element, which set of components is suitable for making a floor covering in accordance with one of the above fifth or sixth aspects.

The floor coverings according to the fifth and sixth aspect of the invention have favorable properties with respect to thermal expansion. It was found that gluing of one or more LVT floor elements according to the fifth or sixth aspect of the invention to an underfloor had a highly positive effect on, i.e. reduced, thermal expansion.

According to some embodiments, the adhesive layer can be applied to the foamed polymer layer of the underfloor, and wherein the adhesive layer is optionally provided with a protective film.

According to some embodiments, the adhesive layer can be applied to a side of the LVT floor elements, and wherein the adhesive layer is optionally provided with a protective film.

A protective film is a film that is applied to the adhesive and must be removed in order to allow the adhesive to exert its adhesive force. Such protective film is also referred to as release film.

The underfloor and the one or more floor elements, and all possible embodiments and possible features, are those described with respect to the fifth and sixth aspect of the invention.

The adhesive and the adhesive layer according to this seventh aspect of the invention are those described for the fifth and sixth aspect of the invention.

According to an eighth aspect a floor covering is provided comprising a. a flexible underfloor comprising at least one foamed polymer layer;

b. one or more floor elements, each floor element having a layered structure comprising a core layer formed from polymer, to which or in which one or more reinforcing layers is/are attached or embedded, and a finishing layer on this core layer, the total surface weight of the one or more reinforcing layers being at least 60 grams per $m^2$ of floor element;

c. an adhesive layer that bonds the underfloor and the one or more floor elements to one another.

Preferred features described for the fifth, sixth or seventh aspect of the invention also apply for this eighth aspect, unless they are technically incompatible.

Multiple floor elements are preferably floor elements lying adjacent to one another. The polymer can for example be polyvinylchloride (PVC), polypropylene (PP) or polyethylene (PE).

The floor elements can be LVT floor elements, for example rigid or flexible LVT floor elements.

According to its ninth aspect, the present invention is also intended to provide a floor covering that is less likely to produce noise when walked on.

A floor covering according to a ninth aspect of the invention comprises g. a flexible underfloor comprising at least one foamed polymer layer;

h. one or more rigid LVT floor elements, each floor element having a layered structure comprising a core layer formed from hard or semi-hard PVC, to which or in which optionally one or more reinforcing layers is/are attached or embedded;

i. an adhesive layer that bonds the underfloor and the one or more floor elements to one another.

According to some embodiments, when more than one rigid LVT floor element is contained in the floor covering, the rigid LVT floor elements are preferably floor elements lying adjacent to one another. The rigid floor elements can be provided on one or more sides of a coupling means in order to couple two floor elements to each other. This coupling means can be any coupling means known in the prior art, for example tongue and groove coupling means, coupling means comprising click systems, coupling means comprising fold-down systems, coupling means comprising rotating profiles, and the like. It is therefore clear that such a floor element is preferably provided at least on one pair of opposite edges with coupling means which allow two of such floor panels to be coupled to each other, wherein in the coupled state, an interlock occurs both in a horizontal direction perpendicular to the relevant edges and in the plane of the coupled panels as well as in a vertical direction perpendicular to the plane of the coupled panels.

According to some embodiments, the total surface weight of the one or more reinforcing layers of the floor elements can be at least 60 g/m², for example at least 80 grams per m² of floor element, more preferably at least 100 g/m².

The underfloor used in the context of the present eighth aspect of the invention preferably shows the features of the underfloor described by means of the first aspect of the invention and/or the preferred embodiments thereof.

The floor covering according to the invention further comprises at least one rigid LVT floor element. The PVC for the LVT floor elements is typically polyvinyl chloride or a copolymer of vinyl chloride and vinyl acetate.

The one or more rigid LVT floor elements lying adjacent to one another each have a layered structure comprising a core layer of hard or semi-hard PVC and a finishing layer or top layer.

Luxury vinyl tiles or "LVT" are PVC floor elements that are composed of a layered structure. They comprise a top layer which itself is also layered and typically comprises a decorative layer to which a wear layer and optionally a coating is applied.

The decorative layer can be a PVC layer, optionally a film that is provided with a decor. Decorative layers, for example films with a thickness of between 0.08 mm and 0.3 mm of soft or semi-hard PVC or hard PVC are such decorative layers. In the case of thinner decorative layers (with thicknesses of up to approximately 0.15 mm), semi-hard PVC with a relatively low filler content (up to 25 wt % based on total PVC) is more likely to be used, whereas for thicker layers, for example films (over 0.15 mm), soft PVC with a filler content of up to 150 phr is more likely to be used. Thinner decorative layers are preferably PVC films, whereas thicker decorative layers are more likely to be used for emulsion or (micro)suspension polymerization layers.

The wear layer is typically a hard or semi-hard transparent PVC layer with a thickness of between 0.15 mm and 1 mm (for example between 0.2 mm and 0.55 mm) and optionally provided with abrasive particles, for example $Al_2O_3$ particles. Plasticizers of up to 40 phr are provided in this PVC. Preferred ranges for plasticizers are less than 40 phr, more preferably 25 to 35 phr. The PVC is typically free of fillers. The layer can be supplied as a film, as emulsion or (micro) suspension polymerization layers, by calendering, or as a plastisol layer.

A coating can be applied on this wear layer, for example a PU layer, for example a UV-curing PU layer. The thickness can be up to 20, even 30 μm, but is preferably approximately 10 μm thick.

Under the top layer, these PVC floor elements comprise a core layer, also referred to as a substrate.

In the context of this invention, flexible and rigid indicate in this case as well whether or not the floor elements, when a strip product is glued on one side and can move freely on the other opposite side, sag much under their own weight. Flexible also means that a product will sag under its own weight by more than 35 cm per m of projecting length. Preferably, a product should sag under its own weight by more than 40 cm per m of projecting length, such as more than 50 cm per m of projecting length. Consequently, rigid or stiff means that a product will sag under its own weight by less than 35 cm per m of projecting length.

For rigid LVT floor elements, the core layer should primarily comprise hard or semi-soft PVC. The core layer can comprise one or more, for example two reinforcing layers that are embedded on or between the hard or semi-soft PVC layer or layers. The reinforcing layer or layers comprises a fiber web, often a glass fiber web, in which the hard or semi-hard PVC is partially or completely impregnated. Glass fiber webs with a surface weight of between 25 and 150 g/m² can be used, for example webs with a surface weight of between 30 and 75 g/m².

According to the invention, the total surface weight of the one or more reinforcing layers is at least 60 g/m², preferably at least 80 grams per m² of floor element, more preferably at least 100 g/m².

The core layer comprises hard or semi-hard PVC that in total is between 2 mm and 6 mm thick, for example between 3 mm and 4.5 mm, into or on which the reinforcing layers are incorporated. For example, one of the reinforcing layers can provide the underside of the floor element.

A portion of the PVC can be present in the core layer above the uppermost of the one or more glass fiber webs. The thickness of this PVC layer above the uppermost of the one or more glass fiber webs can be between 0.3 mm and 0.7 mm. The thickness of the PVC layer between the uppermost and undermost glass fiber web, in cases where multiple glass fiber webs are provided, can vary between for example 2 and 4 mm. A portion of the PVC can be present in the core layer under the undermost of the one or more glass fiber webs. The thickness of this PVC layer under the undermost of the one or more glass fiber webs can be between 0.3 mm and 0.7 mm. In cases where a reinforcing layer is provided, this layer can lie centrically or eccentrically with respect to the layer of hard or semi-hard PVC.

The hard or semi-hard PVC preferably comprises up to 15 phr of plasticizer, ideally between 7 and 10 phr. The hard or semihard PVC preferably comprises up to 70 wt % of fillers (based on the entire weight of the PVC composition).

On the side of the core layer that is in contact with the top layer, a layer of soft or semi-hard PVC can also further be present, preferably with a thickness of between 0.25 and 0.75 mm, such as for example between 0.35 mm and 0.55 mm. This PVC preferably comprises more than 30 phr of plasticizer (for example between 30 and 50 phr of plasticizer) and can comprise more than 50 wt % of fillers. The thickness of this layer can vary between 0.3 and 1 mm, for example between 0.35 mm and 0.75 mm.

Rigid LVT floor elements often have limited surface dimensions. They can be configured as "planks," preferably being rectangular surfaces with a width of between 8 and 50 cm and a length of between 50 and 200 cm, preferably between 1.0 and 1.2 m long and between 0.12 and 0.23 m wide.

The different layers can be produced by means of PVC plastisol. In alternative form, the layers are extruded PVC layers, or they are formed by melting together of PVC particles or are formed by calendering.

The completely or incompletely impregnated reinforcing layer in the rigid LVT floor elements can be a textile reinforcing layer. This textile layer preferably comprises a glass fiber textile, for example a nonwoven glass fiber textile or a woven glass fiber textile. This glass fiber textile preferably has a surface weight of 15 to 80, such as 25 to 55 g/m². The LVT floor element can comprise several such reinforcing layers, for example textile reinforcing layers, so that the total sum of the surface weights of these reinforcing layers is more than 65 g/m².

Preferably, a woven glass fiber textile has an open structure, for example a mesh structure or mesh fabric. Preferably, the open space between successive warp or weft threads can be between 1 mm and 1 cm.

Rigid LVT floor elements often have limited surface dimensions. They can be configured as "planks," preferably being rectangular surfaces with a width of between 8 and 50 cm and a length of between 50 and 200 cm.

The different layers can be produced by means of PVC plastisol. In alternative form, the layers are extruded PVC layers, or they are formed by melting together of PVC particles or by calendering or extrusion.

The floor elements can be provided on their upper side with a relief that can be pressed in during production by embossing and/or can be obtained by means of a chemical embossing technique.

According to the invention, the one or more rigid LVT elements optionally comprise at least one, but possibly two or more reinforcing layers.

According to some embodiments, one of the at least one reinforcing layer(s) can be embedded in the core layer.

According to some embodiments, one of the at least one reinforcing layer(s) can be positioned between the core layer and the finishing layer.

According to some embodiments, the LVT floor elements can comprise at least two reinforcing layers.

According to some embodiments, one of the two reinforcing layers can be embedded in the core layer, and a reinforcing layer is positioned between the core layer and the finishing layer.

According to some embodiments, the at least one reinforcing layer of the floor elements can comprise a first and a second reinforcing layer, each of which has a surface weight of at least 15 $g/m^2$, and preferably each of which has a surface weight of at least 25 $g/m^2$.

According to some embodiments, the one or more reinforcing layers of the floor elements are glass fiber webs or glass fiber fabrics.

According to some embodiments, the LVT floor element cannot comprise a reinforcing layer. Preferably, this LVT floor element is obtained by extrusion.

According to some embodiments, the underfloor can comprise a reinforcing layer, and wherein each of the at least one LVT floor element(s) comprises at least one reinforcing layer.

A floor covering according to a tenth aspect of the invention comprises
  d. a flexible underfloor comprising at least one foamed polymer layer, and at least one reinforcing layer;
  e. one or more rigid LVT floor elements lying adjacent to one another, each floor element having a layered structure comprising a core layer of PVC, to which or in which at least one reinforcing layer is attached or embedded, and a finishing layer on this core layer;
  f. an adhesive layer that bonds the underfloor and the one or more floor elements to one another;
for which the total surface weight of the reinforcing layers of the underfloor and the floor element is preferably is at least 65 grams per $m^2$.

The total surface weight of the reinforcing layers of the underfloor and the floor element is preferably at least 80 grams per $m^2$, more preferably at least 100 grams per $m^2$.

The LVT floor elements used for this tenth aspect of the invention can have the features described for LVT floor elements used in the floor covering according to the first aspect of the invention.

The underfloor used for this tenth aspect of the invention can have the features described for the underfloor used in the floor covering according to the first aspect of the invention, with the additional feature that the underfloor comprises at least one reinforcing layer that is optionally embedded in the polymer layer.

The reinforcing layer can be located on the polymer layer or be impregnated at the surface in the polymer layer. According to other embodiments, the at least one reinforcing layer can be embedded in the polymer layer, whether or not to half of the thickness of the polymer layer. In this case, the reinforcing layer is preferably completely impregnated in the polymer of the polymer layer. The at least one reinforcing layer can be located between the flexible foamed polymer layer and the adhesive layer if the adhesive layer is attached to the underfloor.

The reinforcing layer can be a textile reinforcing layer, for example a glass fiber textile, for example a nonwoven or woven, with a surface weight of between 15 and 80 $g/m^2$, more preferably between 25 and 40 $g/m^2$.

The textile reinforcing layer can be impregnated with polymer, and preferably impregnated with the same type of polymer (optionally an identical polymer) as the polymer of the polymer layer of the underfloor.

The underfloor can also comprise two or more mutually identical or different reinforcing layers.

The PVC layers and materials described in the context of the first or second aspect of the invention preferably comprise PVC with a K value of between 50 and 90.

According to an eleventh aspect a set of components is provided, comprising an underfloor and at least one floor element.

A set of components comprises an underfloor and at least one floor element, which set of components is suitable for making a floor covering according to the ninth and/or the tenth aspect and/or the preferred embodiments thereof.

The floor coverings according to the ninth and tenth aspect of the invention have favorable properties with respect to thermal expansion. It was found that gluing of one or more rigid LVT floor elements according to the ninth or tenth aspect of the invention to an underfloor had a highly positive effect on, i.e. reduced, thermal expansion.

According to some embodiments, the adhesive layer can be applied to the foamed polymer layer of the underfloor, and wherein the adhesive layer is optionally provided with a protective film.

According to some embodiments, the adhesive layer can be applied to a side of the LVT floor elements, and wherein the adhesive layer is optionally provided with a protective film.

A protective film is a film that is applied to the adhesive and must be removed in order to allow the adhesive to exert its adhesive force. Such protective film is also referred to as release film.

The underfloor and the one or more floor elements, and all possible embodiments and possible features, are those described with respect to the ninth and/or tenth aspect of the invention.

The adhesive and the adhesive layer according to this eleventh aspect of the invention are those described for the ninth and tenth aspect of the invention.

According to a twelfth aspect a floor covering is provided comprising
  a. a flexible underfloor comprising at least one foamed polymer layer;
  b. one or more rigid floor elements, each floor element having a layered structure comprising a core layer formed of a polymer to which or in which optionally one or more reinforcing layers is/are attached or embedded, and a finishing layer on this core layer, the total surface weight of the one or more reinforcing layers being at least 60 grams per $m^2$ of floor element;
  c. an adhesive layer that bonds the underfloor and the one or more floor elements to one another.

Features described for the ninth, tenth or eleventh aspects of the invention are also applicable for this twelfth aspect, unless they are technically incompatible.

Multiple floor elements are preferably floor elements lying adjacent to one another. The polymer of which the core layer is produced can for example be PVC, polypropylene (PP), or polyethylene (PE).

The floor elements can be rigid LVT floor elements.

The independent and dependent claims show specific and preferred features of the embodiments of the invention. Features of the dependent claims may be combined with features of the independent and dependent claims, or with features described above and/or below, in any suitable manner that is clear to a person skilled in the art.

The above-mentioned and other features, characteristics and advantages of the present invention will now be clarified by means of the following examples of embodiments, optionally in combination with the drawings.

The description of these examples of embodiments is given as a clarification, without the intention of limiting the scope of the invention. The reference numbers given in the following description refer to the drawings. The same reference numbers in optionally different figures refer to the same or similar elements.

BRIEF DESCRIPTION OF THE DRAWINGS

In order to better illustrate features of the invention, as examples that are in no way limitative, several preferred embodiments are described below with reference to the attached drawings, wherein.

iii)

DETAILED DESCRIPTION OF VARIOUS EMBODIMENTS

The present invention is described below by means of specific embodiments.

It must be noted that the term "comprising," such as used for example in the claims, must not be interpreted in a limitative sense, i.e. limitative with respect to the following elements, features and/or steps. The term "comprising" does not exclude the presence of other elements, features or steps.

The scope of an expression "an article comprising the elements A and B," is therefore not limited to an article that comprises only the elements A and B. The scope of an expression "a method comprising the steps A and B," is not limited to a method that comprises only the steps A and B.

In the light of the present invention, these expressions simply mean that the relevant respective elements or steps for the invention are the respective elements or steps A and B.

In the specification below, reference is made to "an embodiment" or "the embodiment." Such a reference means that a specific element or feature described by means of this embodiment is contained in at least this one embodiment.

The occurrence of the terms "in an embodiment" or "in the embodiment" at different locations of this description, however, does not necessarily refer to the same embodiment, although this indeed can refer to the same embodiment.

Moreover, the characteristics or the features can be combined in any suitable manner in one or more embodiments, such as will be clear to the person skilled in the art.

Figure 1:
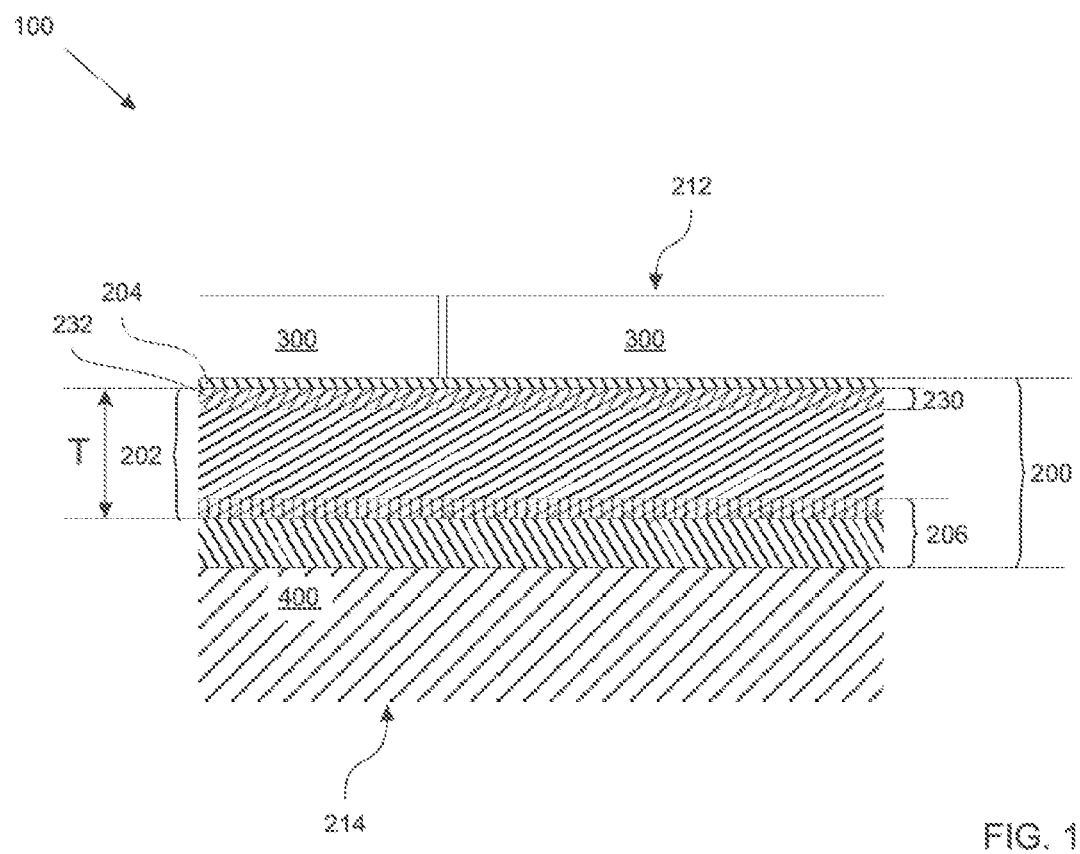
FIG. 1 is a schematic illustration of an underfloor according to the invention.

A cross-section of a floor covering 100 according to the invention is shown schematically in FIG. 1.

The floor covering 100 comprises a preferably flexible underfloor 200 and several vinyl or PVC floor elements 300. In this embodiment, two floor elements 300 adjacent to each other are shown. As an example, these floor elements are dryback elements.

The underfloor 200 is provided with a first flexible and foamed PVC layer 202, which is provided on a first side 212 with the textile reinforcing layer 230. The textile reinforcing layer 230 comprises a textile product 232 which is completely embedded in the first PVC layer 202. On a first outer side of the underfloor, a layer of adhesive 204 is provided.

On the second, opposite side 214, the underfloor is provided with a nonwoven structure 206. This nonwoven structure 206 is partially embedded in the first PVC layer 202.

The side 214 is in contact with the floor 400 to which the covering is applied.

The adhesive 204 of the adhesive layer is for example a pressure sensitive adhesive or PSA applied in an amount of 70 g/m$^2$. As an alternative, an acrylate adhesive can be used, for example in an amount of 30 g/m$^2$. As a further alternative, an adhesive, for example an acrylate adhesive, with an endlessly long open time may be used.

In the textile reinforcing layer 230, a glass fiber nonwoven is completely embedded in the first PVC layer 202. This glass fiber web has a thickness of 0.3 mm and a surface weight of 35 g/m$^2$ The first PVC layer 202 ideally has a thickness T of between 0.6 and 1.4 mm.

The PVC is made of an emulsion polymerization of PVC with a K value of between 57 and 86. The degree of filling (i.e. the weight of the filler based on the weight of the entire formulation of the polymer, optionally PVC, in which the filler is contained) is between 10 and 70 wt %, wherein calcium carbonate is used as a filler.

80 to 120 phr of a plasticizer of the DINP type is used.

The density of the first PVC layer is approximately 650 kg/m$^3$. Foaming is carried out with azodicarbonamide.

The textile product 206 is not necessarily, but is preferably provided. The textile product 206 is a spunbond or needle-punched nonwoven, preferably of polyester, polyamide polyolefins or fiberglass, wherein the thickness can vary between 0.1 mm and 1 mm, for example 0.7 mm, and a surface weight of between 15 and 200 g/m$^2$ is preferably selected. The textile product is partially embedded in the first PVC layer. As an example, a polyester needle-punched with a surface weight of 120 g/m$^2$ is selected. As an alternative, a polyester spunbond web is used with a thickness of between 0.1 and 0.3 mm and a surface weight of 20 g/m$^2$.

The measurements of the underlayer are preferably approximately one m in width and 6 to 20 m in length. Typically, this underlayer is made available in rolled-up form and is to be unrolled onto the floor 400 to be covered, after which the release film (not shown in FIG. 1) is to be removed and the floor elements are to be applied.

Figure 2:
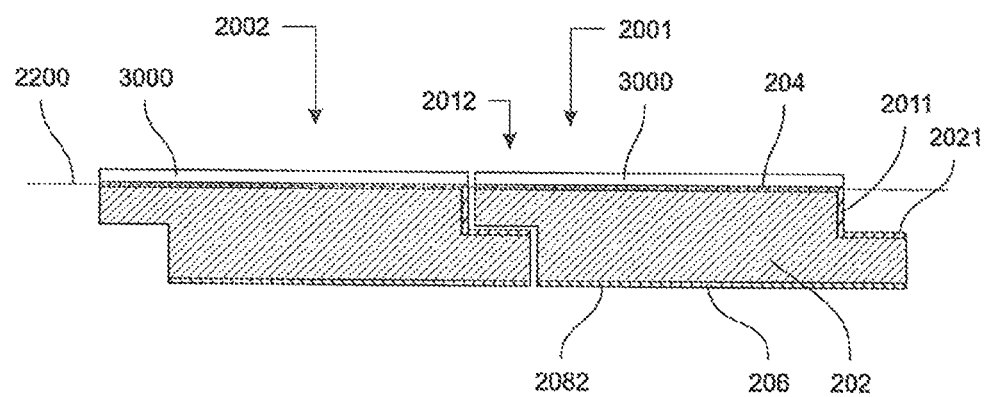
FIG. 2 shows two underlayers laid next to each other according to FIG. 1.

Two underlayers 200 laid adjacent to each other in FIG. 1 are again shown in FIG. 2, with reference nos. 2001-2002. The person skilled in the art further understands that several such underlayers can be laid adjacent to one another. Here, the underlayers are also provided with their release film 3000.

The underlayer 2001 is provided on a first edge 2011 with a recess on the side 2021 where the adhesive is present. The underlayer 2001 is on a second edge 2012, opposite to the first edge 2011, is provided with a recess on the side 2022 opposite the side 2021 where the adhesive is present. The underlayer 2002 is also provided on corresponding sides of such recesses.

As the recess on the first side of a first underlayer 2001 for floor covering is brought into contact with the recess on the second side of a second underlayer 2002 for floor covering, the two underlayers for floor covering are substantially coplanar and lie in the plane 2200.

Figure 3:
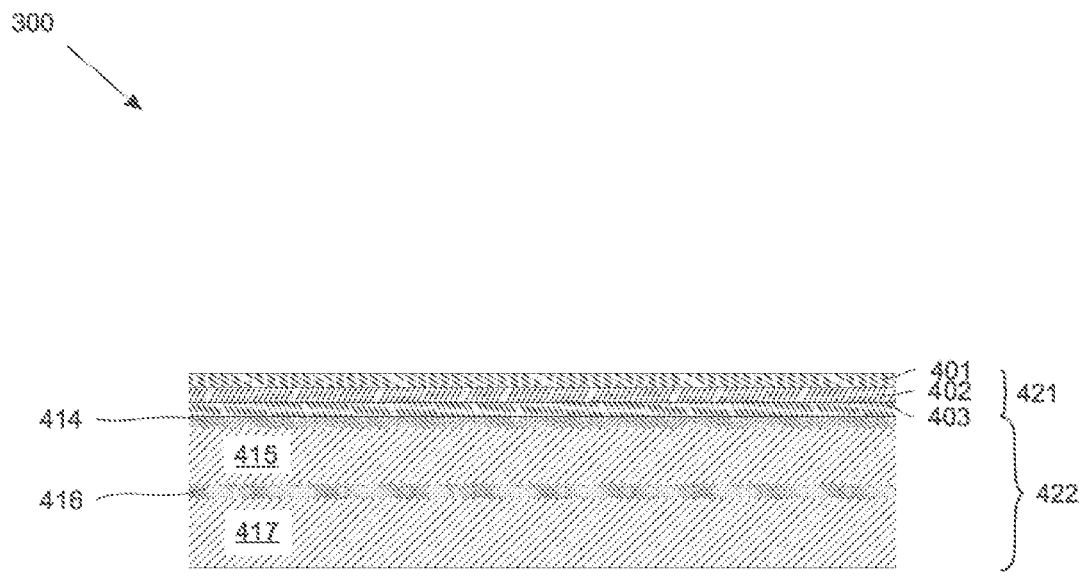
FIG. 3 is a schematic illustration of sheet vinyl such as that used in the context of the first, second, third or fourth aspect of the invention; and iv)

An embodiment of the floor element 300 is shown in FIG. 3. The finishing layer or top layer 421 comprises a decorative layer 403, and on it, a wear layer 402 and a lacquer layer 401.

Under the top layer or finishing layer 421 is a core layer 422 that is composed of a number of calendered soft PVC layers.

The core layer 422 comprises a first glass fiber web 414 impregnated with soft PVC. This glass fiber web has a thickness of 0.35 mm and comprises PVC with approximately 60 phr of plasticizer and up to 50 wt % of filler.

The core layer 422 further comprises layers of soft PVC. In this case, a glass fiber web 416 is incorporated that is positioned between a set of upper layers (together with the soft or semi-hard PVC layer 415) and a set 417 of underlayers or backlayers. The glass fiber web 416 is impregnated with soft PVC. The core layer 422 has a thickness of up to 5 mm. The soft PVC comprises approximately 35 phr of plasticizer and up to 66 wt % of filler. This floor element 300 is a sheet vinyl floor element.

Alternatively, the floor elements 300 of FIG. 1 can also be configured as dryback elements. For example, the floor elements 300 shown are two LVT elements laid adjacent to each other that can also have a cross-section such as that shown in FIG. 4.

Figure 4:
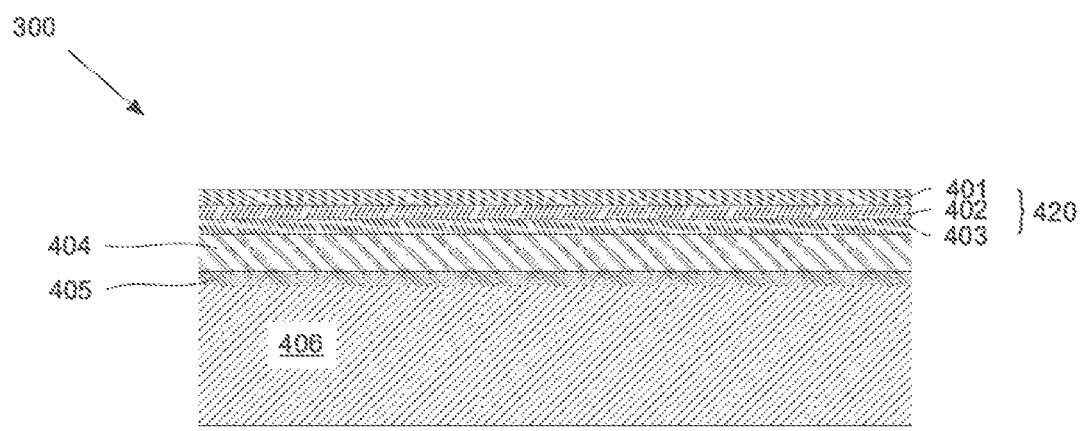
FIG. 4 is a schematic view of an LVT floor element such as in the fifth, sixth, seventh or eighth aspect of the invention.

A first embodiment shown in FIG. 4 has a top layer 420 consisting of a PU lacquer layer 401 (UV-hardened) with a thickness of 10 μm and a wear layer 402 lying hereunder with between 30 and 38 phr of plasticizer and without fillers. This layer 402 has a thickness of between 0.2 and 0.55 mm. The top layer 420 further comprises a decorative layer 403, i.e. a PVC film with a thickness 0.09 mm printed with a decor. The PVC of this film comprises between 10 and 15 phr of plasticizer and up to 15 wt % of filler.

Under this top layer is an extruded PVC layer 404 with a thickness of between 0.16 and 1.56 mm. The PVC comprises, in addition to approximately 35 phr of plasticizer, up to 75 wt % of filler. Under this layer 404 is a reinforcing layer, i.e. a glass fiber web 405 with a surface weight of approximately 60 g/m² that is embedded in the further underlying layer of PVC 406. This underlying layer 406 is obtained by pressing the PVC beads of which the layer 406 was constructed together while increasing the heat above the glass transition temperature. The glass fiber web 405 is incorporated into the softened PVC during formation of the layer 406. The composition of the PVC beads is, in addition to PVC, approximately 40 phr of plasticizer and up to 75 wt % of filler; the layer 406 obtained has a thickness of between 1.4 mm and 2.56 mm. The floor element is provided on its upper side with a relief by embossing. This floor element is a flexible LVT embodiment.

An alternative embodiment has a roughly identical structure to that in FIG. 4, and has a top layer consisting of a PU lacquer layer (UV-hardened) with a thickness of 10 μm and a wear layer lying hereunder with between 30 and 38 phr of plasticizer and without fillers. This layer has a thickness of between 0.2 and 0.55 mm. The top layer further comprises a decorative layer, i.e. a PVC film with a thickness of 0.09 mm printed with a decor. The PVC of this film comprises between 10 and 15 phr of plasticizer and to 15 wt % of filler.

Under this top layer is an extruded PVC layer that has a thickness of between 0.3 and 0.7 mm. The PVC comprises, in addition to approximately 35 phr of plasticizer, up to 75 wt % of filler.

Under this layer, but on top of the reinforcing layer, is a layer of rigid PVC with a thickness of approximately 0.4 to 0.5 mm and comprising PVC with approximately 10 phr of plasticizer and approximately 66 wt % of filler.

This is followed by two reinforcing layers, i.e. glass fiber webs with a surface weight of approximately 60 g/m² that are embedded in the further underlying rigid PVC layers. These underlying rigid PVC layers are obtained by pressing together of the PVC beads while increasing the heat above the glass transition temperature. The glass fiber webs are incorporated into the softened PVC during formation of the layer. The composition of the PVC beads is, in addition to PVC, approximately 10 phr of plasticizer and up to 75 wt % of filler; the layer obtained has a thickness of between 3 mm and 4.25 mm. The two glass fiber webs are at a distance of between 1.7 and 3 mm from each other. This floor element is a rigid LVT embodiment.

According to another alternative embodiment, not shown here, the floor element comprises a top layer consisting of a PU lacquer layer (UV-hardened) with a thickness of 10 μm and a wear layer lying hereunder comprising between 30 and 38 phr of plasticizer and without fillers. This layer has a thickness of between 0.2 and 0.55 mm. The top layer further comprises a decorative layer, i.e. a PVC film with a thickness of 0.09 mm printed with a decor. The PVC of this film comprises between 10 and 15 phr of plasticizer and up to 15 wt % of filler.

Under this top layer is an extruded PVC layer that has a thickness of between 0.3 and 0.7 mm. The PVC comprises, in addition to approximately 35 phr of plasticizer, up to 75 wt % of filler.

Under this layer, but on top of the reinforcing layer, is a layer of rigid PVC with a thickness of approximately 0.4 to 0.5 mm and comprising PVC with approximately 10 phr of plasticizer and approximately 66 wt % of filler.

This is followed by two reinforcing layers, i.e. glass fiber webs with a surface weight of approximately 60 g/m² that are embedded in the further underlying rigid PVC layers. These underlying rigid PVC layers are obtained by pressing together of the PVC beads while increasing the heat above the glass transition temperature. The glass fiber webs are incorporated into the softened PVC during formation of the layer. The composition of the PVC beads is, in addition to PVC, approximately 10 phr of plasticizer and up to 75 wt % of filler; the layer obtained has a thickness of between 3 mm and 4.25 mm. The two glass fiber webs are at a distance of between 1.7 and 3 mm from each other. This floor element is a rigid LVT embodiment.

According to another alternative embodiment, not shown here, the floor element comprises a top layer consisting of at least one wear layer, for example of PVC without fillers. This layer preferably has a thickness of between 0.2 and 0.55 mm, or even up to 0.78 mm. The top layer further comprises a decorative layer, preferably comprising a PVC film printed with a decor having a thickness of for example 0.09 mm. The PVC of this film can comprise between 10 and 15 phr of plasticizer and up to 15 wt % of filler.

Under this top layer is an extruded PVC layer that has a thickness of between 2 and 6 mm. The PVC of the extruded layer is hard PVC with a plasticizer content as defined above or without plasticizer, and up to 75 wt % of filler.

This floor element is a rigid LVT embodiment. Such a floor element is preferably at least provided on one pair of opposite edges with coupling means which allow two of such floor panels to be coupled to each other, wherein in the coupled state, an interlock occurs both in a horizontal direction perpendicular to the relevant edges and in the plane of the coupled panels as well as in a vertical direction perpendicular to the plane of the coupled panels.

It is clear that although the embodiments and/or the materials for providing embodiments according to the present invention are discussed, various amendments or modifications may be applied without departing from the scope of action and/or the spirit of this invention. The present invention is by no means limited to the embodiments described above, but can be realized according to different variants without departing from the scope of the present invention.

The invention claimed is:

1. A floor covering comprising:
   (a) a flexible underfloor comprising at least a first and a second underlayer, wherein each of the first and second underlayers comprises at least one foamed polymer layer; wherein the first underlayer has a first edge, and the second underlayer has a second edge; wherein the second edge overlaps the first edge with the first underlayer and the second underlayer being substantially coplanar, wherein the first edge faces the second edge at a first seam;
   (b) at least first and second sheet vinyl floor elements, each of the first and second sheet vinyl floor elements has a layered structure comprising:
      a soft or semi-hard PVC layer, to which or in which at least one reinforcing layer is attached or embedded, and
      a finishing layer comprising at least one of a decorative layer, a wear layer, and a coating or lacquer layer on an outer side of the layered structure;
      wherein the first sheet vinyl floor element has a third edge and the second sheet vinyl floor element has a fourth edge, wherein the third edge faces the fourth edge at a second seam;
   (c) an adhesive layer that bonds the underfloor and the first and second sheet vinyl floor elements to one another,
   wherein a total surface weight of the at least one reinforcing layer is at least 30 grams per $m^2$ of the floor element;
   wherein at least the first or the second underlayer extends continuously from below the first sheet vinyl floor element to below the second sheet vinyl floor element to bridge the second seam;
   wherein one of the first sheet vinyl floor element and the second sheet vinyl floor element bridges the first seam.

2. The floor covering of claim 1, wherein the underfloor, in or on its at least one foamed polymer layer, comprises at least one reinforcing layer.

3. The floor covering of claim 2, wherein the at least one reinforcing layer of the underfloor is a glass fiber web or glass fiber fabric.

4. The floor covering of claim 1, wherein the at least one foamed polymer layer of the underfloor is a polymer layer of PVC, PU, or PVB.

5. The floor covering of claim 1, wherein the at least one foamed polymer layer of the underfloor is a PVC layer.

6. The floor covering of claim 1, wherein in the at least first and second sheet vinyl floor elements, the at least one reinforcing layer is attached to or embedded in the soft or semi-hard PVC layer.

7. The floor covering of claim 1, wherein the at least one reinforcing layer of the at least first and second floor elements comprises a first and a second reinforcing layer.

8. The floor covering of claim 1, wherein in the at least first and second sheet vinyl floor elements, the at least one reinforcing layer is a glass fiber web or glass fiber fabric.

9. The floor covering of claim 1, wherein the underfloor comprises another reinforcing layer, and
   wherein the at least one reinforcing layer of each of the at least first and second sheet vinyl floor elements comprises one or two reinforcing layers.

10. A set of components comprising at least two underlayers for assembling a flexible underfloor and at least two floor sheet vinyl elements, which set of components is suitable for making a floor covering in accordance with claim 1.

11. The set of components of claim 10, wherein the adhesive layer is applied to the at least one foamed polymer layer of the underfloor, and
    wherein the adhesive layer is provided with a protective film.

12. The set of components of claim 10, wherein the adhesive layer is applied to one side of at least one of the first and second sheet vinyl floor elements, and
    wherein the adhesive layer is provided with a protective film.

13. The floor covering of claim 1, further comprising a backlayer formed from soft PVC.

14. A floor covering comprising:
    (a) a flexible underfloor comprising at least a first and a second underlayer, wherein each of the first and second underlayers comprises at least one foamed polymer layer and at least one reinforcing layer; wherein the first underlayer has a first edge, and the second underlayer has a second edge; wherein the second edge overlaps the first edge with the first underlayer and the second underlayer being substantially coplanar; wherein the first edge faces the second edge at a first seam;
    (b) at least first and second sheet vinyl floor elements lying adjacent to one another, each of the first and second sheet vinyl floor elements has a layered structure comprising:
       a back layer of soft PVC;
       a soft or semi-hard PVC layer, to which or in which at least one reinforcing layer is attached or embedded, and
       a finishing layer comprising at least one of a decorative layer, a wear layer, and a coating or lacquer layer on an outer side of the layered structure;
       wherein the first sheet vinyl floor element has a third edge and the second sheet vinyl floor element has a fourth edge, wherein the third edge faces the fourth edge at a second seam;
    (c) an adhesive layer that bonds the underfloor and the backlayer of the first and second sheet vinyl floor elements to one another;

for which a total surface weight of the at least one reinforcing layer of the underfloor and the floor element is at least 30 grams per m$^2$;

wherein at least the first or the second underlayer extends continuously from below the first sheet vinyl floor element to below the second sheet vinyl floor element to bridge the second seam;

wherein one of the first sheet vinyl floor element and the second sheet vinyl floor element bridges the first seam.

15. A floor covering comprising:
(a) a flexible underfloor comprising at least a first and a second underlayer, wherein each of the first and second underlayers comprises at least one foamed polymer layer, wherein the first underlayer has a first edge, and the second underlayer has a second edge; wherein the second edge overlaps the first edge with the first underlayer and the second underlayer being substantially coplanar, wherein the first edge faces the second edge at a first seam;
(b) at least first and second LVT floor elements, each of the first and second floor elements has a layered structure comprising a core layer formed of PVC, to which or in which at least one reinforcing layer is attached or embedded, and a finishing layer on the core layer, a total surface weight of the at least one reinforcing layer is at least 60 grams per m$^2$ of floor element; wherein the first LVT floor element has a third edge and the second LVT floor element has a fourth edge, wherein the third edge faces the fourth edge at a second seam;
(c) an adhesive layer that bonds the underfloor and the first and second LVT floor elements to one another;

wherein at least the first or the second underlayer extends continuously from below the first LVT floor element to below the second LVT floor element to bridge the second seam;

wherein one of the first LVT floor element and the second LVT floor element bridges the first seam.

16. The floor covering of claim 15, wherein one of the at least one reinforcing layer is embedded in the core layer.

17. The floor covering of claim 15, wherein one of the at least one reinforcing layer is positioned between the core layer and the finishing layer.

18. The floor covering of claim 15, wherein the first and second LVT floor elements comprise at least two reinforcing layers.

19. The floor covering of claim 18, wherein one of the two reinforcing layers is embedded in the core layer, and another reinforcing layer is positioned between the core layer and the finishing layer.

20. A floor covering comprising:
(a) a flexible underfloor comprising at least a first and a second underlayer, wherein each of the first and second underlayers comprises at least one foamed polymer layer and at least one reinforcing layer; wherein the first underlayer has a first edge, and the second underlayer has a second edge; wherein the second edge overlaps the first edge with the first underlayer and the second underlayer being substantially coplanar, wherein the first edge faces the second edge at a first seam;
(b) at least first and second LVT floor elements lying adjacent to one another, each floor element having a layered structure comprising a core layer of PVC, to which or in which at least one reinforcing layer is attached or embedded, and a finishing layer on the core layer; wherein the first LVT floor element has a third edge and the second LVT floor element has a fourth edge, wherein the third edge faces the fourth edge at a second seam;
(c) an adhesive layer that bonds the underfloor and the first and second LVT floor elements to one another;

for which a total surface weight of the at least one reinforcing layer of the underfloor and the floor element is at least 65 grams per m$^2$;

wherein at least the first or the second underlayer extends continuously from below the first LVT floor element to below the second LVT floor element to bridge the second seam;

wherein one of the first LVT floor element and the second LVT floor element bridges the first seam.

* * * * *